United States Patent
Wang et al.

(10) Patent No.: US 9,586,169 B2
(45) Date of Patent: Mar. 7, 2017

(54) METHOD FOR MANUFACTURING GRANULES FROM A LIQUID

(71) Applicant: Green Granulation Technology Limited, Hong Kong (CN)

(72) Inventors: Wei Wang, Beijing (CN); Mengguang Wang, Newark, DE (US)

(73) Assignee: Green Granulation Technology Limited, Hong Kong (CN)

( * ) Notice: Subject to any disclaimer, the term of this patent is extended or adjusted under 35 U.S.C. 154(b) by 507 days.

(21) Appl. No.: 14/173,366

(22) Filed: Feb. 5, 2014

(65) Prior Publication Data

US 2015/0217221 A1    Aug. 6, 2015

(51) Int. Cl.
*B01D 47/06* (2006.01)

(52) U.S. Cl.
CPC .................................. *B01D 47/06* (2013.01)

(58) Field of Classification Search
None
See application file for complete search history.

(56) References Cited

U.S. PATENT DOCUMENTS

| 4,662,929 A | * | 5/1987 | Lammi | C05B 7/00 423/215.5 |
| 5,938,820 A | * | 8/1999 | Peters | B01D 45/12 95/186 |
| 2011/0229394 A1 | | 9/2011 | Niehues | |

FOREIGN PATENT DOCUMENTS

EP    2192099    6/2010

OTHER PUBLICATIONS

Written Opinion of NL 2009295, dated Apr. 29, 2013.

* cited by examiner

*Primary Examiner* — Duane Smith
*Assistant Examiner* — Phillip Shao
(74) *Attorney, Agent, or Firm* — Westman, Champlin & Koehler, P.A.

(57) ABSTRACT

A method for manufacturing granules of, e.g., urea or ammonium nitrate, wherein the ejection of submicron dust to the atmosphere is reduced is described. The method contains an arrangement of three scrubbers wherein the gas withdrawn from the granulator is provided to a first scrubber, resulting in the formation of a first purified gas stream, which is provided to a third scrubber, with the operating temperature of the third scrubber being below than of the first scrubber. In preferred embodiments, the process comprises various recycle streams.

21 Claims, 1 Drawing Sheet

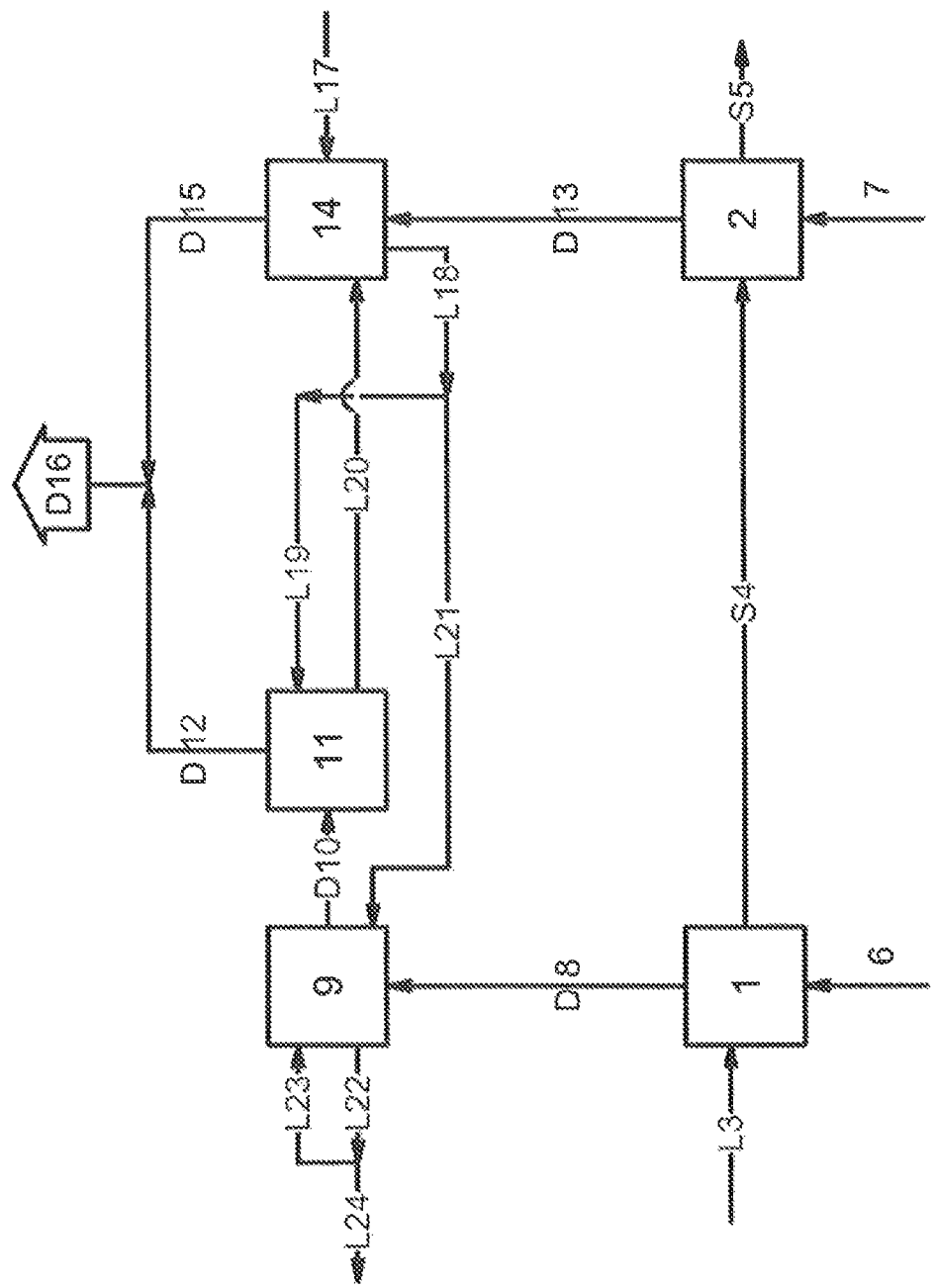

METHOD FOR MANUFACTURING GRANULES FROM A LIQUID

BACKGROUND

The discussion below is merely provided for general background information and is not intended to be used as an aid in determining the scope of the claimed subject matter.

Aspects of the present invention pertains to a method for manufacturing granules from a liquid through a granulation process. Granulation processes are known in the art, and are often applied for the manufacture of, e.g., fertilizers. A problem in the manufacture of granules from a liquid of a source material, in particular a fertilizer, is that all fertilizer granulations produce an amount of dust in the granulator and in the coolers. The dust is entrained by the air that the exhaust fan is sucking through the granulator and coolers. That entrained dust has to be removed from the air before the air can be vented back into the atmosphere. The recovered dust will be recycled back into the process.

Many types of scrubbers have been developed for removing entrained dust from the air, depending on the particle size of the generated dust and on the requested efficiency of the dust removal. There are basically two types of scrubbers, namely dry scrubbers and wet scrubbers. Dry scrubbers include dust removers like cyclones or filters. They work well for coarse dust particles and have the advantage that they recover the dust as a solid product that can be recycled at low energy cost. Their disadvantages are sensitivity to plugging up (especially when humid air has to be scrubbed) and the low efficiency in removing fine dust particles (unless extreme pressure drops over the dust removers and consequently high power consumptions are used). Wet scrubbers dissolve or suspend the dust in water and recover the dust as a low concentration solution or suspension in water. The wet scrubbers come in different types, they are mostly very reliable and are able to remove fine dust particles without increasing tremendously the pressure drop over the scrubber.

An issue with wet scrubbers is that most of the water or even all of the water must be removed from the solution or suspension before the recovered dust can be recycled again into the process. The water is mostly removed in a vacuum concentrator; this process consumes at least the same amount of steam as the amount of water that is removed. For this reason it is important that the water content of the recovered solution or suspension is as low as possible.

The dust generated in a granulator is a mixture of coarse particles (0.1 mm or even more produced by the crushers) and fine particles (in the 10-50 micron range produced by the sprayers). In some cases like urea or ammonium nitrate granulation, the granulators can also produce an amount of sub-micron dust, i.e. dust with a particle size below 1 micron, more specifically below 0.5 micron. Such extremely fine dust is not generated by mechanical items like crushers or sprayers but is produced by reactions between gases present in the air.

For example, in the case of granulation of ammonium nitrate, the ammonium nitrate melt contains an amount of dissolved free ammonia and free nitric acid. When the hot melt comes in contact with air ammonia and acid evaporate from the melt and are entrained by the air, they will recombine later into extremely fine particles when the air stream is cooled. For urea, extremely fine particles may be formed as follows: at high temperature, e.g., in the range of 120-140° C., urea will partially convert into ammonium cyanate (equilibrium concentration, depending on the temperature in the range of 0-1 wt. %). At the stated temperature, ammonium cyanate may split into ammonium and cyanuric acid, which may evaporate. Upon a decrease in temperature, the ammonium and cyanuric acid will combine to form very fine particles of ammonium cyanate, which will in turn be converted to urea.

The sub-micron particles are visible in the exhaust air stream as turbidity (after dissipation of the water vapor in case of a wet scrubber). They are too fine to be caught on any mechanical filter or droplet catcher. Some are so fine that they even escape the standard dust sampling methods because those methods do not consider that particle size as "particulate matter" any more. Nevertheless, submicron dust is a pollutant and a loss of product for the process. There is therefore need for a granulation process wherein submicron dust is removed at least in part. Such process should be flexible and energy-efficient.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention provides a method for manufacturing granules from a liquid solution of a source material. The process enables the manufacture of granules in an effective, energy-efficient, and flexible way, while reducing the amount of submicron dust that is evicted to the atmosphere.

A method for manufacturing granules, comprises providing a liquid comprising source material to a granulator, withdrawing solid granules from the granulator and providing them to a granulate cooler, withdrawing cooled granules from the granulate cooler, withdrawing a first dust-containing gas from the granulator, and providing it to a first scrubber, and in the first scrubber contacting the dust-containing gas with an aqueous liquid, resulting in the formation of a first purified gas stream and a first aqueous liquid containing source material, and withdrawing the first purified gas stream from the first scrubber, and withdrawing the first aqueous liquid containing source material from the first scrubber, withdrawing a second dust-containing gas from the granulate cooler, and providing it to a second scrubber, and in the second scrubber contacting the dust-containing gas with an aqueous liquid, resulting in the formation of a second purified gas stream and a second aqueous liquid containing source material, and withdrawing the second purified gas stream from the second scrubber, and withdrawing the second aqueous liquid containing source material from the second scrubber, providing the first purified gas stream from the first scrubber to a third scrubber, and in the third scrubber contacting the first purified gas stream with an aqueous liquid, resulting in the formation of a third purified gas stream and a third aqueous liquid containing source material, and withdrawing the third purified gas stream from the third scrubber, and withdrawing the third aqueous liquid containing source material from the third scrubber, wherein the operating temperature of the third scrubber is below the operating temperature of the first scrubber.

A feature of the process is that by applying the specified scrubber regimen, the concentration of source material in the final gas stream will be very low. This is because the process is equipped to address all dust fractions, including the submicron dust which often passes through conventional processes. Other advantages of the process will become clear from the further specification.

The present invention is suitable for processing any source material which is converted into particles in a granulating process which is accompanied by dust formation, in particular by the formation of dust which contains a fraction with a particle size in the submicron range. Examples of suitable source materials are fertilizers, in particular urea and ammonium nitrate.

In the first step a liquid comprising of source material is provided to a granulator where granules are formed. Granulators are known in the art, and require no further elucidation. The liquid provided to the granulator generally is as highly concentrated as possible, i.e., it contains as much source material as possible, and as little other material as possible. It may sometimes also be indicated as a melt. For example, for urea, the liquid may comprises 85-97 wt. % of urea, and water, in particular 93-97 wt. %. For another example, for ammonium nitrate, the liquid may comprises 90-99 wt. % of ammonium nitrate, and water, in particular 94-99 wt. %. The liquid may optionally contain particles of solid material, as long as they do not interfere with the processing conditions. It is within the scope of the skilled person to determine an optimum concentration.

The solid granules formed in the granulator are withdrawn from the granulator and provided to a granulate cooler, where they are contacted with a cooling air stream. The cooled granules are removed from the granulator and processed as required. These steps are known in the art and require no further elucidation.

A dust-containing gas is withdrawn from the granulator, and provided to a first scrubber. This air stream is coming from the section of the granulator where the liquid comprising source material is sprayed to form granules. The gas stream generally has a temperature of at least 90° C. As a maximum, a value of 140° C. may be mentioned.

For urea it is preferred for the gas stream to have a temperature in the range of 90-120° C. For ammonium nitrate it is preferred for the gas stream to have a temperature in the range of 100-140° C., more in particular 125-130° C.

The gas stream withdrawn from the granulator contains a substantial amount of dust, with varying particle sizes. The gas stream contains coarse dust particles generated, e.g., by the crushers, and fine dust particles, generated by, e.g., the sprayers. Aspects of the invention are particularly suitable for granulation processes where the hot gas stream also contains components that will upon cooling generate submicron dust. For urea granulation, the amount of submicron dust may, e.g., be in the range of 0.05-1 wt. % of the total urea processed, more in particular in the range of 0.2-0.8 wt. %.

Within the context of the present specification, coarse dust consists of particles with an average particle size of at least 0.05 mm, in particular at least 0.1 mm. The average particle size of coarse dust generally is below 1 mm, more in particular below 0.8 mm.

Fine dust within the context of the present specification is dust with an average particle size in the range of 10-50 micron.

Submicron dust within the context of the present specification is dust with an average particle size below 1 micron. In general, the submicron dust has an average particle size in the range of 100 nm to 1 micron, in particular below 0.5 micron. In one embodiment all submicron dust passes through a 0.4 micron dust filter, implying a maximum particle diameter below 0.4 micron.

Not wishing to be bound by theory it is believed that the coarse dust is generated for the most part as granulate or in the crushers, while the fine dust is generated for the most part in the sprayers, and the submicron dust is generated by reaction as described above.

In the first scrubber the dust-containing gas obtained from the granulator is contacted with an aqueous liquid, resulting in the formation of a first purified gas stream and a first aqueous liquid containing source material. The first purified gas stream and the first aqueous liquid are withdrawn from the first scrubber.

The first aqueous liquid may be processed as desired. In one embodiment it is recycled in its entirety or in part to the granulation step. Depending on the concentration of the first aqueous liquid, it may be subjected to a concentration step. The concentration of the aqueous solution is determined by the amount of dust, by the amount of liquid contacted with the dust-containing gas stream, and by the concentration of source material in the aqueous liquid provided to the scrubber. It is within the scope of the skilled person to regulate the process condition in the first scrubber.

It is preferred for the first aqueous liquid to have a concentration of source material of at least 35 wt. %. For urea, the concentration is, e.g., in the range of 40-60 wt. %, preferably 45-55 wt. %. For ammonium nitrate the concentration is, e.g. in the range of 40-70 wt. %, in particular 50-70 wt. %.

In one embodiment of the invention it is preferred for the first scrubber to use a relatively large amount of liquid per kg of air, e.g., in the range of at least 0.8 kg liquid per kg air, more in particular at least 1 kg liquid per kg air. This is relatively high as compared to conventional scrubbers, which use an amount of liquid of about 0.3 kg liquid per kg air. The reason behind the preference for a scrubber using a large amount of water per kg air is that it will lead to a relatively high amount of water in the resulting first purified gas stream, and this improves the operating efficiency of the third scrubber, which is used to purify the gas stream from the first scrubber. The maximum amount of liquid is not critical to this embodiment of the present invention. For reasons of operating efficiency a value of at most 4 kg liquid per kg air may be applied.

In one embodiment, the dust loaded air enters the scrubber from the top, with sprayers being installed in the incoming air duct that spray the scrubber liquid into the air. It is preferred for the sprayers to be installed in such a way that all the incoming air will be properly wetted. Preferably, the sprayers are pointing downwards in order to recover part of the pump energy and save energy in the exhaust fan. During the spraying process water will evaporate from the scrubber liquid to the point that the water content of the air stream will be close to the saturation point of air stream at that respective temperature, in equilibrium with the partial water vapor pressure of the scrubber liquid that has been sprayed. Air and scrubber liquid will be at the same temperature after the sprayers.

It has been found that the use of a large amount of liquid per kg air leads to advantages. In one embodiment of the invention a recycle step is operated over the granulator scrubber, wherein liquid containing source material is withdrawn from the bottom of the scrubber and recycled back into the air stream of the scrubber. In this process the granulator scrubber can operate at a much higher concentration of the recovered solution than conventional wet scrubbers, where less liquid per kg air is used. The amount of recycled solution that is sprayed in the incoming air duct is so large, that the evaporation of water from this solution during the spraying will only slightly increase the concentration of the solution/suspension (less than 1% increase, typically 0.5%). In conventional granulator scrubbers the surge in concentration during similar spraying in the air inlet of the scrubber can locally be as much as 10 to 15 times higher, so these scrubbers must operate at lower (safer) source material concentrations in the recovered solution/suspension. For this reason, in this embodiment of the invention operation of this scrubber remains reliable at concentrations very close to salting out concentration of the recovered source material solution/suspension.

The first scrubber preferably has the high liquid stream described above. The second scrubber, which scrubs the air from the granulator cooler, and the third scrubber, which scrubs the purified gas stream from the granulator scrubber, may or may not have the above configuration.

If so desired, droplet catchers can be installed in the scrubbers at the location where the purified gas is removed from the scrubber. This is of particular relevance in the third scrubber and the second scrubber, where the air that is withdrawn may be vented to the atmosphere. It may also be attractive to install a droplet catcher in the first scrubber, to prevent needless transport of source material from the first scrubber to the third scrubber.

It is a feature of one embodiment of the present invention that the third scrubber, which processes the gaseous effluent from the first scrubber is operated at a lower temperature than the first scrubber. In this way, water present in the gas stream entering the third scrubber will condense in the third scrubber. The particles of submicron dust will act as condensation cores, resulting in an increase in particle size, allowing catching of the submicron dust. The process of catching the submicron dust can be improved, by increasing the condensation of water in the third scrubber. This can be done in various ways. A first way is to ensure that the water concentration in the gas stream provided to the scrubber is as high as possible. This can be done, e.g., by using a scrubber with a high liquid to air ratio, as described above. A further way is to increase the difference between the operating temperature of the first scrubber (i.e. the gas temperature from the first scrubber) and the operating temperature from the third scrubber. The larger this temperature difference, the more water will condensate onto the submicron dust particles. In one embodiment, the difference between the operating temperature of the first scrubber and that of the third scrubber is at least 5° C., in particular at least 8° C., more in particular between 8 and 10° C. A further way to increase the condensation of water in the third scrubber is the provision of the gas stream before it enters the third scrubber to increase the degree of saturation with water of the gas stream. The steam will condense on the particles of submicron dust present in the system, resulting in the formation of droplets. In the third scrubber water will thus condense on the submicron dust particles. The submicron dust particles dissolve in the condensate. This will further cool the droplet and the solution will pick up more moisture until a concentration is obtained that is in equilibrium with the humidity of the air at this temperature. This process will increase the size of the particles/droplets and makes them easier to catch. In one embodiment a suitable demister pad is installed to catch these droplets. The demister pad may be applied in the air stream after the liquid sprayers.

The efficacy of the process can be increased by the application of various recycle streams.

In one embodiment, the aqueous liquid provided to the first scrubber and/or the aqueous liquid provided to the second scrubber and/or the aqueous liquid provided to the third scrubber comprises source material. More specifically, in one embodiment the aqueous liquid provided to the first scrubber consists at least in part of aqueous liquid containing source material withdrawn from the second scrubber. Additionally or alternatively it is preferred for the aqueous liquid provided to the third scrubber to consist at least in part of aqueous liquid containing source material withdrawn from the second scrubber. Additionally or alternatively, at least part of the aqueous liquid withdrawn from the third scrubber is provided to the second scrubber.

In one embodiment, the process is carried out in such a manner that fresh water is added to the second scrubber, that the liquid provided to the first scrubber and the third scrubber consists for at least 50 vol. % of aqueous liquids which are recycle streams, in particular for at least 70%, more in particular for at least 90%. In one embodiment, the liquid provided to the first scrubber and the third scrubber consists essentially of recycle streams, with all the water that evaporates from the system or is otherwise removed from the system being compensated by adding fresh clean makeup water to the second (cooler) scrubber.

In one embodiment, the first scrubber and/or the second scrubber and/or the third scrubber are equipped with recycle loops wherein liquid effluent is withdrawn from the bottom of the scrubber and provided to the top of the scrubber. As indicated above, and as will also be discussed in more detail below, liquid may also be provided to the other scrubbers. The provision of a recycle stream over the scrubber is particularly advantageous where a high liquid to air ratio in the scrubbers is desired, in particular in the first scrubber, as discussed above. In one embodiment the recycle stream in the first scrubber is so high that the ratio of the volume of the recycle stream to the volume of liquid added to the first scrubber is at least 5:1, in particular at least 7:1. In one embodiment, effluent withdrawn from the first scrubber is recycled to the granulation step, if necessary with an intermediate evaporation step. In general, an evaporation section will be applied wherein most of the water will be evaporated. This evaporation will consume steam so it is beneficial to find a good balance between low steam consumption and reliable operation (no crystallization of the recovered scrubber solution/suspension).

It can be advantageous that the operating temperature of the third scrubber is below that of the first scrubber, to allow catching of submicron dust. It has been found that this can be ensured relatively easily by using liquid derived from the second scrubber as feed for the third scrubber. The second scrubber, which scrubs the gas from the cooler section, generally has an operating temperature which is below that of the third scrubber. This means that the liquid derived from the second scrubber can be used in the third scrubber to cool the gas stream to the third scrubber to ensure condensation therein. Another attractive feature is to feed liquid derived from the third scrubber to the second scrubber, where it is cooled again. By applying this combined recycle of cooler liquid from the second scrubber to the third scrubber, and hotter liquid from the third scrubber to the second scrubber, an energy efficient recycle loop is set up.

In one embodiment, the first scrubber, which scrubs the gas from the granulator, has an operating temperature in the range of 40-50° C., while the second scrubber, which scrubs the gas from the granulate cooler, has an operating temperature in the range of 25-40° C., in particular 30-35° C., with the third scrubber, which scrubs the gas from the first scrubber is operated at a temperature between that of the first scrubber and the second scrubber, e.g., in the range of 35-45° C., in particular 35-40° C.

The operating temperature of a scrubber is a balance between the temperature and amount of the ingoing gas, the temperature and amount of the ingoing liquid, and the temperature and amount of the recycle liquid. It is within the scope of the skilled person to regulate the various amounts and temperatures to ensure that the desired operating temperature is obtained. If so desired, intermediate heating or cooling of gas or liquid streams may be applied if desired.

In one embodiment, the source material is urea. In this embodiment the dust-containing gas provided to the first scrubber preferably has a temperature in the range of 100-120° C., and comprises coarse urea dust with an average particle size of at least 0.05 mm, in particular at least 0.1 mm, and fine urea dust with an average particle size below 50 micron. The aqueous liquid provided to the first scrubber has a temperature in the range of 40-50° C., and the temperature of the first aqueous liquid containing urea and the purified air is in the range of 40-50° C.

It is preferred for the aqueous liquid containing urea produced in the first scrubber to have an urea concentration in the range of 35-55 wt. %.

In one embodiment the dust-containing gas provided to the second scrubber has a temperature in the range of 60-90° C., and the aqueous liquid provided to the second scrubber has a temperature in the range of 25-40° C., and the temperature of the second aqueous liquid containing urea and the purified air is in the range of 25-40° C. It is preferred for the aqueous liquid containing urea produced in the second scrubber to have an urea concentration in the range of 1-20 wt. %. Preferably, the effluent gas stream from the first scrubber with a temperature of 40-50° C. is provided to the third scrubber to be combined with an aqueous liquid with a temperature in the range of 20-45° C., in particular 25-40° C.

In another embodiment, the source material is ammonium nitrate. In this case the dust-containing gas provided to the first scrubber preferably has a temperature in the range of 100-140° C., and comprises coarse ammonium nitrate dust with an average particle size of at least 0.05 mm, in particular at least 0.1 mm, and fine ammonium nitrate dust with an average particle size below 50 micron. The aqueous liquid provided to the first scrubber preferably has a temperature in the range of 40-50° C., and the temperature of the first aqueous liquid containing ammonium nitrate and the purified air is in the range of 40-50° C. In one embodiment, the aqueous liquid containing ammonium nitrate produced in the first scrubber has an ammonium nitrate concentration in the range of 40-70 wt. %. In one embodiment the dust-containing gas provided to the second scrubber has a temperature in the range of 60-90° C., and the aqueous liquid provided to the second scrubber has a temperature in the range of 25-40° C., and the temperature of the second aqueous liquid containing ammonium nitrate and the purified air is in the range of 25-40° C. It is preferred for the aqueous liquid containing ammonium nitrate produced in the second scrubber has an ammonium nitrate concentration in the range 1-20 wt. %. It is preferred for the effluent gas stream from the first scrubber with a temperature of 40-50° C. to be provided to the third scrubber to be combined with an aqueous liquid with a temperature in the range of 20-45° C., in particular 25-40° C.

In one embodiment, a part of the liquid resulting from the second scrubber which scrubs the gas from the granulate cooler, is provided to the first, granular scrubber. The liquid derived from the second scrubber generally has a relatively low concentration, e.g., less than 10 wt. %, and a relatively low temperature, e.g., in the range of 25-35° C. This lean recovered solution/suspension will be added to the first (granulator) scrubber to dilute and control the concentration of the recovered solution/suspension of that scrubber. Compared to the second (cooler) scrubber, this first granulator scrubber operates at much higher concentration in the recovered solution/suspension (typically at least 45 wt. % depending on the kind of source material). Also the temperature of the air and the recovered solution/suspension is higher after saturation (typically 40 to 50 deg C) The reason for the higher temperature is that the air enters the first scrubber at higher temperature and contains more water than the air entering the second cooler scrubber, as the air provided to the first scrubber contains water that is evaporated from the melt sprayed in the granulator spraying section. In order to guarantee smooth operation of the first (granulator) scrubber, the concentration of the recovered solution/suspension must remain safely below the salting out point of this solution/suspension at this scrubber temperature, and the provision of liquid from the second (cooler) scrubber helps to ensure that this is the case.

BRIEF DESCRIPTION OF THE DRAWING

The FIGURE is a schematic diagram of a system for manufacturing granules.

DETAILED DESCRIPTION OF THE ILLUSTRATIVE EMBODIMENTS

Aspects of the present invention will be elucidated with reference to the drawing without being limited thereto or thereby.

In the drawing the references have the following meaning:
L=liquid, used as prefix for liquid stream; S=solid, used as prefix for solid material such as granules, D=dust, used as prefix for dust-containing gas streams.
1 granulator
2 granulate cooler
L3 liquid solution
S4 solid granules (hot)
S5 solid granules (cooled)
6 ambient air
7 ambient air
D8 dust-containing gas
9 first scrubber, for scrubbing air from granulator
D10 first purified gas from first scrubber
11 third scrubber, for scrubbing gas derived from the first scrubber
D12 purified gas
D13 dust-containing gas
14 second scrubber
D15 purified gas
D16 purified gas to atmosphere
L17 water
L18 liquid containing source material
L19 liquid containing source material
L20 liquid containing source material
L21 liquid containing source material
L22 liquid containing source material
L23 liquid containing source material
L24 liquid containing source material The liquid material to be granulated (L3) is provided to granulator (1), together with ambient air (6). The liquid material to be granulated is hot. The hot granules (S4) are provided to granulate cooler (2), where they are contained with ambient air (7), to result in a cooled material (S5), which is withdrawn from the system.

A dust-containing gas stream (D8) is withdrawn from the granulator. The temperature of the dust-containing gas stream (D8) depends on the granulation conditions. It generally varies between 90° C. and 140° C., more in particular between 100° C. and 130° C. The dust-containing gas stream is provided to a first scrubber (9), where it is contacted with an aqueous liquid. The aqueous liquid is for the main part recycle liquid from the scrubber itself recycled through lines (L22) and (L23). Liquid effluent from the second scrubber (14), which is a solution containing source material, e.g. urea or ammonium nitrate is provided in a make up stream through line (L21), to compensate for evaporation and removal through (L24). In one embodiment the stream from the second scrubber (L21) makes up 2-10 vol. % of the recycle stream (L23).

The concentration of the source material in stream L21 the solution may vary in wide ranges. In one embodiment it is in the range of 1-20 wt. %, more in particular in the range of 1-10 wt. %, still more in particular in the range of 1-5 wt. %.

The temperature in the first scrubber (9) may vary in wide ranges. It is dependent on the gas temperature and on the temperature of the liquid provided to the scrubber. As a general range, a range of 40 to 50° C. may be mentioned both for urea and for ammonium nitrate. From the first scrubber (9) a liquid stream (L22) is withdrawn, which contains source material. The liquid stream generally contains source material in a relatively high concentration, e.g. in a concentration of at least 35 wt. %, more in particular at least 45 wt. %. For urea the liquid stream (L22) contains urea in a concentration of, e.g., 35 to 55 wt. %, in particular of 45 to 55 wt. %. For ammonium nitrate, the concentration in the liquid stream ranges, e.g., from 35 to 70 wt. %, in particular from 40 to 70 wt. %, more in particular from 50 to 70 wt. %. Part of the liquid stream (L22) may be recycled to the first scrubber (9) through recycle loop (L23). The remaining stream (L24), may be processed as desired. In one embodiment it is recycled in whole or in part to the granulator (1) through combination with stream (L3), whether or not after it has been subjected to one or more concentration steps or further purification steps. In one embodiment the volume of the remaining stream (L24) is quite small, e.g., between 2 and 10 vol. % of recycle stream (L23).

From the first scrubber (9), a purified gas stream (D10) is withdrawn, which is provided to a third scrubber (11). The gas stream derived from the first scrubbed still comprises source material, in particular submicron dust which is formed by reaction of gaseous components in the first scrubber. The reaction conditions applied in the first scrubber are not adequate to remove the submicron dust.

The third scrubber (11) is operated at a temperature below that of the first scrubber (14), so that water present in purified gas stream (D10) can condensate on the submicron particles present in that stream to increase their particle size and improve the catching thereof. The dust-containing gas stream (D10) generally has the same temperature as the operating temperature of the first scrubber (9), which is 40-50° C.

In the third scrubber (11), the dust-containing gas stream (D10) is contacted with an aqueous liquid. In the FIGURE, the aqueous liquid is a liquid containing source material (L19), derived from the second scrubber (14). Properties of this liquid will be discussed below. From third scrubber (11), a purified gas stream (D12) is withdrawn, which is which is sufficiently clean to be evacuated to the atmosphere through outlet (16). If so desired intermediate purification equipment, such as an additional demister may be provided in the air stream between the third scrubber (11) and the outlet to the atmosphere (D16), to compensate for faulting apparatus, is present.

From the third scrubber (11) an aqueous liquid containing source material (L20) is withdrawn, which, in the embodiment illustrated in the FIGURE, is provided to second scrubber (14) to act as scrubbing liquid. The aqueous liquid containing source material (L20) has a temperature between that of purified gas stream (D10) and the liquid (L18) derived from the second scrubber. In one embodiment, the temperature of liquid stream (L20) is in the range of 35-43° C. The concentration of source material present in the liquid (L20) may very between wide ranges, e.g. in the range of 1-20 wt. %, in particular 1-10 wt. %, more in particular 1-5 wt. %. It is interesting to note that the embodiment illustrated in the FIGURE, there is a stream of liquid containing source material (L18, L19) leading from the second scrubber (14) to the third scrubber (11), and a stream of liquid containing source material leading (L20) leading from the third scrubber (11) to the second scrubber (14). The main difference between these streams is that the temperature of the stream (L20) is higher than the temperature of stream (L18, L19). The concentration of source material in the liquid will be in the same range.

From granulate cooler (2), a dust-containing gas (D13) is withdrawn. The dust-containing gas stream (D13) has a temperature which is lower than that of the dust-containing gas (D8) withdrawn from granulator (1). The temperature of dust-containing gas stream D13 generally is in the range of 60 to 90° C., in particular in the range of 70-85° C. In the second scrubber (14) the dust-containing gas (D13) is contacted with an aqueous liquid. The aqueous liquid can be derived from various sources. In one embodiment, not shown in the FIGURE, liquid withdrawn from the second scrubber is recycled back to the second scrubber. This could, e.g., be a splitoff from line (L19). In one embodiment, the liquid withdrawn from the second scrubber is divided into two fractions, e.g. with a volume ratio in the range of 20:80 to 80:20, more specifically 40:60 to 60:40 wherein one fraction is provided to the third scrubber (11) and the other fraction is provided to the second scrubber (14). In the FIGURE, makeup water is provided to the scrubber through stream (L17), but it may also be provided to the stream (L18). In one embodiment the fresh water feed (L17) makes up between 5 and 10 wt. % of the total liquid provided to the second scrubber (14). In the illustrated embodiment, the amount of fresh water added through L17 is the same as the amount of liquid removed through L24 plus any evaporation from the system. It will be evident to the skilled person that makeup water can also be added at other locations in the system.

Liquid to the second scrubber (14) may also be provided from the third scrubber (11). This stream (L20) has a concentration of source material in the same range as stream (L19) to the first scrubber, but a higher temperature. The temperature in the second scrubber (14) is determined by the temperature of the dust-containing gas stream, and the temperature of the various liquid streams. The second scrubber (14) is generally operated at a temperature in the range of 25 to 40° C., in particular 30-35° C., both for urea and ammonium nitrate. The second scrubber (14) generates a purified gas stream (D15), which is sufficiently clean to be evacuated to the atmosphere through outlet (16).

The liquid (L18) withdrawn from the second scrubber (14) contains source material. In general, this solution is relatively dilute, containing source material in a concentration of, e.g., less than 10 wt. %, e.g. in the range of 1-5 wt. %. The liquid containing source material (L18) generally has a temperature in the range of 25-40° C., in particular 30-35° C.

The liquid containing source material (L18) can be processed in various manners. In one embodiment, not shown on the FIGURE, the liquid is recycled in part to second scrubber (14), as discussed above. Further, as also discussed above the liquid may be provided in part to the first scrubber (9) as liquid containing source material (L21). The liquid may, again as discussed above be provided in part to the third scrubber (11) as liquid containing source material (L19). In one embodiment, of the total of the liquid containing source material (L18), 5 to 10 vol. % is provided to the first scrubber (9) as liquid containing source material (L21), while 40 to 60 vol. % is provided to the third scrubber (11) as liquid containing source material (L19), and 40 to 60 vol. % is recycled back to scrubber (14).

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A method for manufacturing granules, comprising:
providing a liquid comprising source material to a granulator,
withdrawing solid granules from the granulator and providing them to a granulate cooler,
withdrawing cooled granules from the granulate cooler,
withdrawing a first dust-containing gas from the granulator, and providing it to a first scrubber, and in the first scrubber contacting the first dust-containing gas with an aqueous liquid, resulting in the formation of a first purified gas stream and a first aqueous liquid containing source material, and withdrawing the first purified gas stream from the first scrubber, and withdrawing the first aqueous liquid containing source material from the first scrubber,
withdrawing a second dust-containing gas from the granulate cooler, and providing it to a second scrubber, and in the second scrubber contacting the second dust-containing gas with an aqueous liquid, resulting in the formation of a second purified gas stream and a second aqueous liquid containing source material, and withdrawing the second purified gas stream from the second scrubber, and withdrawing the second aqueous liquid containing source material from the second scrubber,
providing the first purified gas stream from the first scrubber to a third scrubber, and leading at least a part of the second aqueous liquid containing source material via a first line of a recycle loop between the second scrubber and the third scrubber and in the third scrubber contacting the first purified gas stream with the second aqueous liquid containing source material, resulting in the formation of a third purified gas stream and a third aqueous liquid containing source material, and withdrawing the third purified gas stream from the third scrubber, and withdrawing the third aqueous liquid containing source material from the third scrubber, which is at least partly returned to the second scrubber via a second line of the recycle loop, wherein the operating temperature of the third scrubber is below the operating temperature of the first scrubber.

2. The method according to claim 1, wherein the aqueous liquid provided to the first scrubber and/or the aqueous liquid provided to the second scrubber and/or the aqueous liquid provided to the third scrubber comprises source material.

3. The method according to claim 1 wherein the operating temperature of the third scrubber is higher than that of the second scrubber.

4. The method according to claim 1, wherein the aqueous liquid provided to the third scrubber comprises at least in part of aqueous liquid containing source material withdrawn from the second scrubber.

5. The method according to claim 1, wherein at least part of the aqueous liquid withdrawn from the third scrubber is provided to the second scrubber, and at least part of the aqueous liquid withdrawn from the second scrubber is provided to the third scrubber, with the liquid provided from the second scrubber to the third scrubber having a lower temperature than the liquid provided from the third scrubber to the second scrubber.

6. The method according to claim 1, wherein fresh water is added to the second scrubber, and wherein the aqueous liquid provided to the first scrubber and the third scrubber consists for at least 50 vol. % of aqueous liquids which are recycle streams.

7. The method according to claim 1, wherein the first scrubber and/or the second scrubber and/or the third scrubber are equipped with recycle loops wherein liquid effluent is withdrawn from the bottom of the scrubber and provided to the top of the scrubber.

8. The method according to claim 1, wherein effluent withdrawn from the first scrubber is recycled to the granulation step, if necessary with an intermediate evaporation step.

9. The method according to claim 1 wherein the aqueous liquid provided to first scrubber is provided in an amount of at least 0.8 kg liquid/kg gas provided to the first scrubber.

10. The method according to claim 1, wherein the source material is urea, and the dust-containing gas provided to the first scrubber has a temperature in the range of 100-120° C., and comprises coarse urea dust with an average particle size of at least 0.05 mm and fine urea dust with an average particle size below 50 micron, and the aqueous liquid provided to the first scrubber has a temperature in the range of 40-50° C., and the temperature of the first aqueous liquid containing urea and the first purified gas stream is in the range of 40-50° C.

11. The method according to claim 10, wherein the aqueous liquid containing urea produced in the first scrubber has an urea concentration in the range of 35-55 wt. %.

12. The method according to claim 10, wherein the dust-containing gas provided to the second scrubber has a temperature in the range of 60-90° C., and the aqueous liquid provided to the second scrubber has a temperature in the range of 25-40° C., and the temperature of the second aqueous liquid containing urea and the second purified gas stream is in the range of 25-40° C.

13. The method according to claim 10, wherein the aqueous liquid containing urea produced in the second scrubber has an urea concentration in the range 1-20 wt. %.

14. The method according to claim 10, wherein the effluent gas stream from the first scrubber with a temperature of 40-50° C. is provided to the third scrubber to be combined with an aqueous liquid with a temperature in the range of 20-45° C.

15. The method according to claim 1, wherein the source material is ammonium nitrate, and the dust-containing gas provided to the first scrubber has a temperature in the range of 100-130° C., and comprises coarse ammonium nitrate dust with an average particle size of at least 0.05 mm, in particular at least 0.1 mm, and fine ammonium nitrate dust with an average particle size below 50 micron, and the aqueous liquid provided to the first scrubber has a temperature in the range of 40-50° C., and the temperature of the first aqueous liquid containing ammonium nitrate and the first purified gas stream is in the range of 40-50° C.

16. The method according to claim 15, wherein the aqueous liquid containing ammonium nitrate produced in the first scrubber has an ammonium nitrate concentration in the range of 35-70 wt. %.

17. The method according to claim 15, wherein the dust-containing gas provided to the second scrubber has a temperature in the range of 60-90° C., and the aqueous liquid provided to the second scrubber has a temperature in the range of 25-40° C., and the temperature of the second aqueous liquid containing ammonium nitrate and the second purified gas stream is in the range of 25-40° C.

18. The method according to claim 15, wherein the aqueous liquid containing ammonium nitrate produced in the second scrubber has an ammonium nitrate concentration in the range 1-20 wt. %.

19. The method according to claim 15, wherein the effluent gas stream from the first scrubber with a temperature of 40-50° C. is provided to the third scrubber to be combined with an aqueous liquid with a temperature in the range of 20-45° C.

20. The method according to claim 6, wherein fresh water is added to the second scrubber, and wherein the aqueous liquid provided to the first scrubber and the third scrubber consists for at least 70 vol. % of aqueous liquids which are recycle streams.

21. The method according to claim 6, wherein fresh water is added to the second scrubber, and wherein the aqueous liquid provided to the first scrubber and the third scrubber consists for at least 90 vol. % of aqueous liquids which are recycle streams.

* * * * *